(12) United States Patent
Jainek

(10) Patent No.: US 6,610,203 B1
(45) Date of Patent: Aug. 26, 2003

(54) LIQUID FILTER, PARTICULARLY FOR OIL OR FUEL IN AN INTERNAL COMBUSTION ENGINE

(75) Inventor: Herbert Jainek, Heilbronn (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/831,769

(22) PCT Filed: Nov. 12, 1999

(86) PCT No.: PCT/EP99/08652

§ 371 (c)(1),
(2), (4) Date: Mar. 1, 2002

(87) PCT Pub. No.: WO00/29724

PCT Pub. Date: May 25, 2000

(30) Foreign Application Priority Data

Nov. 14, 1998 (DE) .......................... 198 52 587

(51) Int. Cl.⁷ .......................... F01M 11/03; B01D 27/08
(52) U.S. Cl. .................. 210/248; 210/436; 210/440; 210/450; 210/454; 210/472
(58) Field of Search ................. 210/248, 436, 210/440, 450, 454, 472

(56) References Cited

U.S. PATENT DOCUMENTS 5,538,626 A * 7/1996 Baumann .................... 210/130
5,922,196 A * 7/1999 Baumann ................. 123/196 A
5,928,511 A * 7/1999 Messner et al. ............ 210/248

FOREIGN PATENT DOCUMENTS

DE 19606616 A1 8/1997

* cited by examiner

Primary Examiner—Matthew O. Savage
(74) Attorney, Agent, or Firm—Crowell & Moring LLP

(57) ABSTRACT

A liquid filter mainly intended for oil or fuel in internal combustion engines, in which the filter comprises a replaceable filter cartridge (17). The filter cartridge is housed in a housing having an essentially central symmetry comprising a housing base and a cover which is designed to be screwed on. In order to avoid leakage residual liquid when the filter housing is opened, especially if the liquid filter is mounted horizontally, a drain screw (22) is actuated before the housing is opened, and in order to achieve the highest possible degree of drainage, the drain screw is moved to the lowest possible position by rotating a threaded member (11) by at most 360°. Upon rotation of the threaded member, a sealing ring (13) ensures tightness in the base (10) of the housing in an area "a". After all the liquid has drained out of the housing through the drain opening (23), the filter housing can then be opened to enable replacement of the filter cartridge without danger of leakage.

11 Claims, 3 Drawing Sheets

LIQUID FILTER, PARTICULARLY FOR OIL OR FUEL IN AN INTERNAL COMBUSTION ENGINE

BACKGROUND OF THE INVENTION

The invention relates to a liquid filter, particularly for oil or fuel of an internal combustion engine with a substantially cylindrical housing and a sealable oil drain.

Such filters are known, for instance, from DE 196 06 616. They comprise a substantially cylindrical filter housing, wherein the replaceable filter cartridge is accommodated in a housing base onto which a screw-on cover is placed. A problem occurs, however, when the filter cartridge is replaced, particularly in horizontally installed filters, because there is an oil residue in the housing. To prevent said oil residue from running out of the housing as the cartridge is being replaced, a return flow channel is provided on the housing base to ensure the return flow of the residual oil from the housing through a special opening in the crankcase of the internal combustion engine.

The disadvantage of this type of construction is that a corresponding return flow opening must be provided in the crankcase. As a result, it is not possible to retrofit engines originally designed for a disposable filter with a liquid filter of this type, since these engines do not have such an opening.

To provide the advantages of greater economic efficiency and environmental compatibility in these older engines as well, EP 0 692 292 proposes a liquid filter in which a sealable drain opening is provided in the housing base. To ensure that this drain opening is located at the lowest point of the filter housing even if the housing is horizontally mounted, the filter is not screwed directly into the connecting piece provided therefor, but is held in the mounting location by a sleeve provided with screw threads. The disadvantage of this type of construction becomes evident in the initial mounting of the filter. The filter must be provided at the mounting location in its individual parts, since the threaded sleeve is accessible only if the housing base is open. This makes final assembly considerably more difficult. In addition, there is a risk that sensitive individual parts, particularly the filter insert, may be damaged, which would affect the quality of the product.

SUMMARY OF THE INVENTION

Thus, it is the object of the invention to create a liquid filter with a replaceable cartridge, which can be used in place of ordinary disposable filters, which may be mounted as a preassembled unit during initial installation, and which ensures reliable drainage of the oil located in the interior of the housing when the filter cartridge is replaced. Said liquid filter is provided for mounting positions with a substantially horizontal center axis or with a housing cover pointing in downward direction.

This object is attained by the invention as described and claimed hereinafter.

The liquid filter according to the invention comprises a substantially cylindrical housing, which is formed by a housing base and a screw-on cover. The housing base is provided with an inlet and an outlet for the fluid to be filtered and is positioned at the mounting location in such a way that its passages communicate with the corresponding openings in the mounting location. A threaded socket, in particular, is provided for this purpose, which is used to screw on the liquid filter. This connection simultaneously provides the outlet. The housing base is provided with a thread along its outer wall by means of which it can be screwed together with the threaded cover. This screwed connection is sealed, for example, by an O-ring. The housing base and screw-on cover together form the holder for the filter cartridge, which is arranged in the housing in such a way that the fluid to be filtered flows through the filter cartridge. In addition, an oil drain is provided in the screw-on cover, which is located in the area of the outer circumference of said screw-on cover. This may be in the area of the cylinder jacket of the screw-on cover or at the edge of its lid area.

When the housing base is screwed onto the threaded socket to mount the liquid filter in the mounting location, the angular position of the liquid filter in relation to its center axis cannot be predicted. The same is true for the oil drain. As a result, for instance if the liquid filter has a horizontal center axis when mounted, the oil drain may not be located at the lowest point of the housing interior. To make it possible nevertheless to drain the residual oil completely from the filter housing prior to replacing the filter cartridge, the screw-on cover can be loosened and subsequently rotated far enough so that the oil drain is located at the lowest point of the housing volume. This simultaneously causes an axial displacement of the screw-on cover within the housing base. To ensure, nevertheless, a reliable seal of the screwed connection between screw-on cover and housing base, sealing means are provided, which guaranty a seal between the housing parts in the area of said axial displacement. This may be accomplished, for instance, by an O-ring, which slides a distance along a sealing surface when the screw-on cover is opened. Said O-ring can simultaneously perform the sealing function when the oil filter is in operation, or a separate seal may be provided for this purpose.

The liquid filter according to the invention is suitable not only for mounting in horizontal position. It can also be installed with its screw-on cover pointing in downward direction. Depending on the mounting position, some residual oil may remain within the filter housing even after the remaining oil has been drained, but this will not interfere with cartridge replacement. This is true particularly for a mounting position in which the screw-on cover points in a slightly upward direction.

According to an advantageous further embodiment of the inventive concept, a sealable vent is provided on the housing in addition to the oil drain. This vent is preferably located in an area opposite the oil drain. When the screw-on cover is rotated, the oil drain thus travels to a lower area of the housing and the vent to a higher area. When the oil drain is opened, air can then flow through the vent into the housing to accelerate the draining process.

In an advantageous variant of the invention, the oil drain is provided with a drain plug. This is a simple component and thus contributes to the economic efficiency of the liquid filter.

A further variant of the invention provides that oil drainage and/or venting be ensured by channels running through the walls of the housing part. Said channels must be made in such a way that they are sealed by the mounted screw-on cover. If the oil is to be drained, the screw-on cover is rotated far enough that the channels are unblocked and one channel is located at the lowest point of the housing. The oil flows out of the housing through said channel. If a second channel is provided, located opposite the first one, that second channel is used as a vent.

A special embodiment of the invention uses as a channel the gaps created between the housing base and the screw-on cover as a result of the thread geometry. As soon as the sealing means unblock the path toward the outside, the oil can flow out of the housing through the thread passages, and air from the outside can flow into the housing. Advantageously, the thread selected is a saw-tooth thread, since this type of thread has large enough gaps in the turns to carry the oil. In addition, the thread can advantageously have an axial recess, which widens the cross-section of the channels. Said recess may consist of a flattening of the thread on the screw-on cover, or of a groove.

These and other features of preferred further developments of the invention are set forth in the claims as well as in the description and the drawings. The individual features may be implemented either alone or in combination in embodiments of the invention or in other fields of application and may represent advantageous embodiments that are protectable per se, for which protection is hereby claimed.

BRIEF DESCRIPTION OF THE DRAWINGS

Further details will now be described with reference to schematic embodiments depicted in the drawings in which.

DETAILED DESCRIPTION OF PREFERRED EMBODIMENTS

Figure 1:
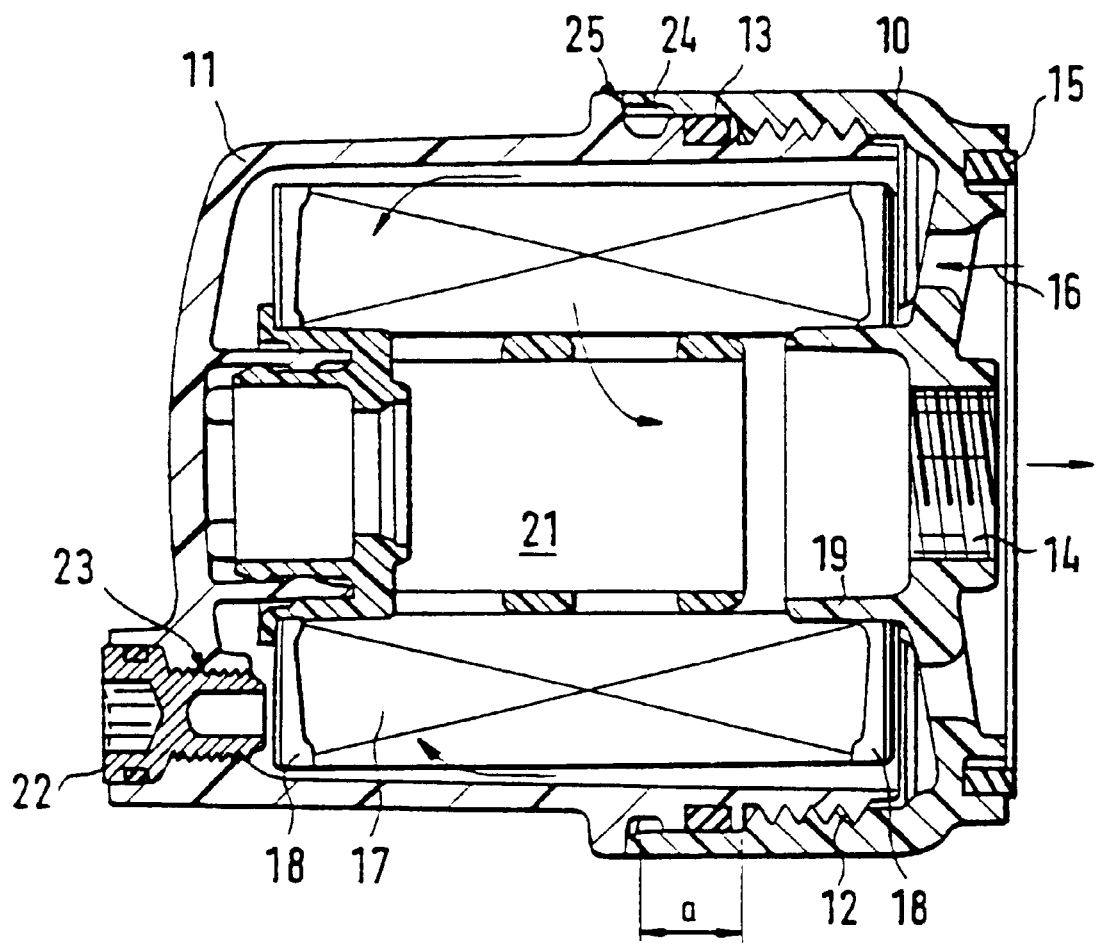
FIG. 1 is a cross section of a liquid filter in which the oil drain is realized by a threaded drain plug at the edge of the cover area of the screw-on cover.

FIG. 1 shows a liquid filter whose housing comprises a housing base 10 and a screw-on cover 11. These housing parts are screwed together by a thread 12. An axial limit stop 25 is provided, which limits the screw-in depth of cover 11 in housing base 10. An O-ring 13 seals the housing interior against its environment. For mounting, the entire liquid filter with its outlet 14 formed by a threaded hole is screwed onto a threaded connection (not shown), which ensures the inflow of filtered oil into the crankcase of an internal combustion engine. A circumferential seal 15 seals the housing base against an opposite surface (not shown) of the mounting location. During operation of the liquid filter, the fluid to be filtered, such as the lubricating oil of an internal combustion engine, flows through an inlet 16 into the filter housing. It then flows through a filter cartridge 17, which is provided with elastic end disks 18 and is mounted in a sealing manner to a connection piece 19 in housing base 10 and a support tube 20 fixed in the screw-on cover. The filtered side of the filter insert is thus formed by an interior 21 in the filter cartridge. From there the filtered fluid leaves the liquid filter through outlet 14.

The filter cartridge 17 may be replaced when operation of the internal combustion engine is stopped. In this case, no oil flows through inlet 16. A certain amount of residual oil remains in the housing, however. To remove said residual oil, the screw-on cover 11 is rotated in opening direction far enough that a drain plug 22 on its outer circumference is located at the lowest point of the housing. The seal of the housing, which is provided by O-ring 13 in an area (a), is still intact. By removing the drain plug 22, an opening 23 is unblocked through which the residual oil in the filter can flow and can then be captured by means of a container.

To accelerate drainage, an axial groove 24 may be provided in the housing base, which bridges the sealing ring in the upper part of the housing as soon as the screw-on cover has been screwed far enough out of the housing base. The O-ring may also be disposed in a groove in screw-on cover 11, and the axial groove for venting the housing interior may be arranged in housing base 10.

Figure 2:
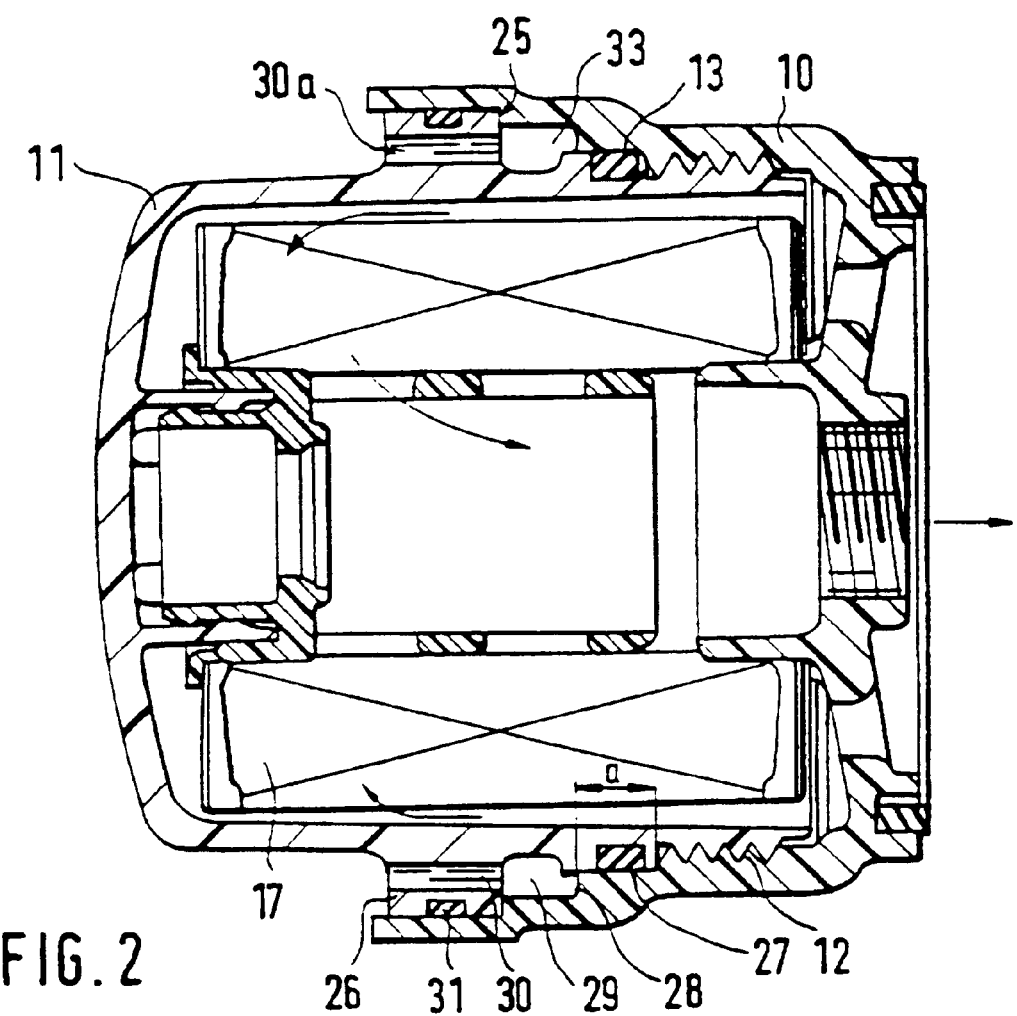
FIG. 2 is a cross section through a liquid filter with channels in the screw-on cover for venting and oil drainage.

FIG. 2 shows an alternative embodiment of the oil drain. The basic structure of the filter corresponds to that depicted in FIG. 1. But on screw-on cover 11 a radially circumferential shoulder 26 is integrally cast, which forms the axial limit stop 25 for housing base 10. During operation of the liquid filter, the screw-on cover 11 is screwed onto housing base 10 up to the limit stop, for which a thread 12 is provided. O-ring 13 ensures a seal between the housing parts. The O-ring is accommodated in an annular groove in screw-on cover 11 and is supported in housing base 10 against a sealing surface 27. Adjacent to said sealing surface 27 is an internal shoulder 28, which causes the diameter of the housing base to be enlarged in relation to the diameter of the sealing surface 27. This creates an annular collector space 29, which during operation of the liquid filter is sealed by O-ring 13 against the housing interior.

Figure 3:
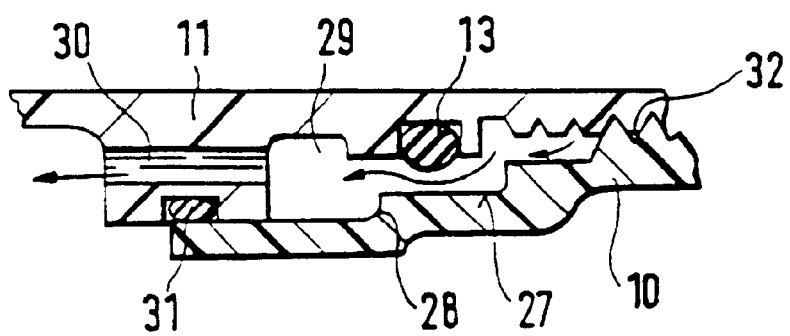
FIG. 3 shows detail X of FIG. 2 with the oil drain open.

The draining process of the liquid filter prior to replacing the filter cartridge 17 is illustrated in FIG. 3. The screw-on cover 11 is unscrewed far enough that the O-ring 13 no longer contacts sealing surface 27 in housing base 10, but travels into the area of internal shoulder 28. This causes collector space 29 to be connected with the housing interior since O-ring 13 no longer rests against a surface and the turns of thread 12 permit the residual oil to pass. From the collector space the oil drains through a bore 30 in shoulder 26. An additional seal 31 in the outer circumference of shoulder 26 assures a seal in area (a) between housing base 10 and screw-on cover 11 during drainage, so that the oil drains only through bore 30 provided for this purpose.

The path of the residual oil through the draining channel is indicated by arrows in FIG. 3. To increase the flow rate of the residual oil in the area of thread 12, said thread can be flattened in the circumferential area of the screw-on cover at the height of bore 30. The recess 32 thus created causes the cross section of the draining channel to be widened in the area of thread 12.

As illustrated in FIG. 2, a channel system 33 may be provided to form a vent, which is configured precisely as described in FIG. 3. Accordingly, it comprises a collector space 29 and a second bore 30a, which is provided in shoulder 26 opposite bore 30.

Figure 4:
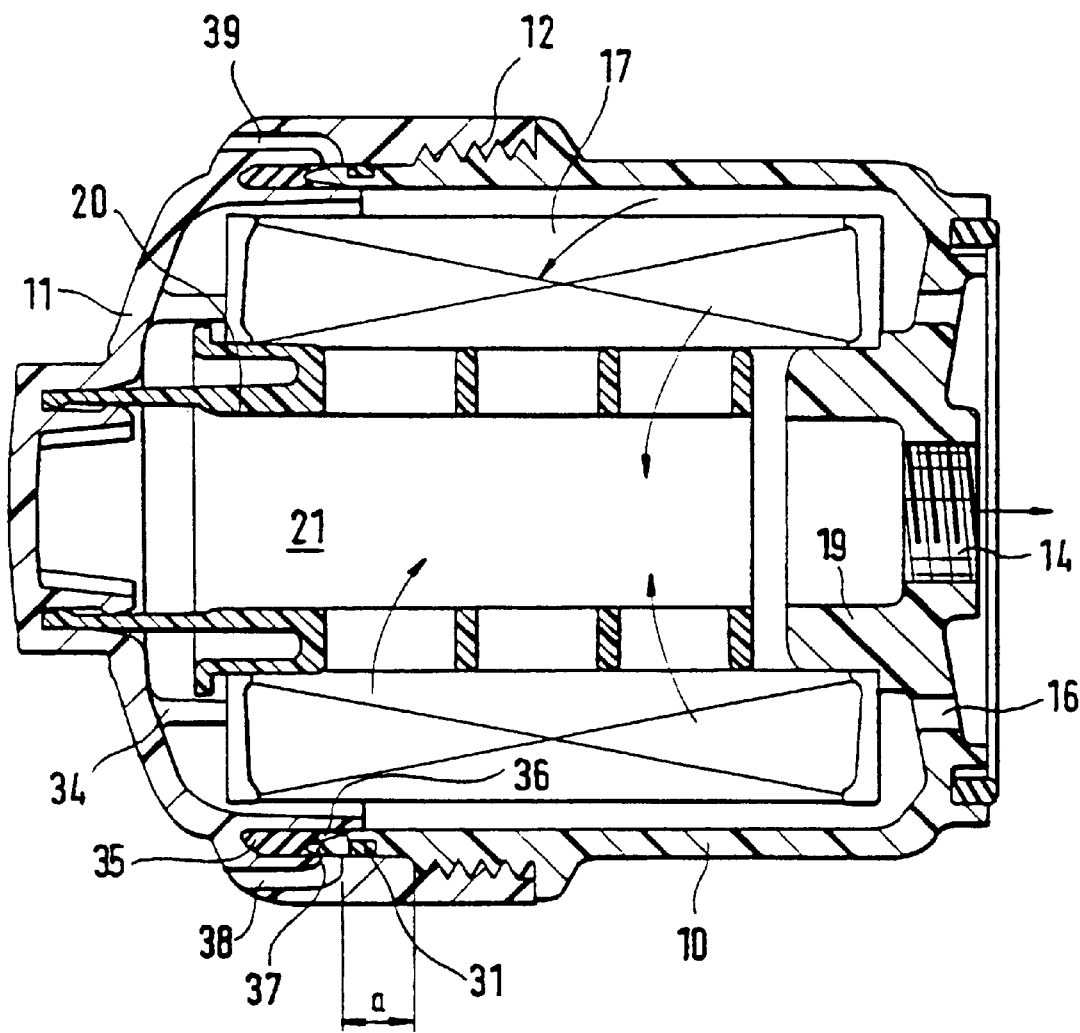
FIG. 4 is a cross section through a liquid filter with an alternative arrangement of the channels in the screw-on cover.

In FIG. 4 an alternative embodiment of the housing for a liquid filter is shown. In contrast to the variants depicted in FIGS. 1 to 3, screw-on cover 11 has an internal thread and housing base 10 has an external thread for mutual coupling. The functioning of the liquid filter, where oil flows through inlets 16 into the housing interior and subsequently from the exterior to the interior through filter cartridge 17 and from interior 21 formed by the cartridge through outlet 14, corresponds to the liquid filter depicted in FIG. 1. The filter cartridge 17 is fixed in the housing by connection 19 and support tube 20, with the additional use of support ribs 34.

The seal between housing base 10 and screw-on cover 11 during operation of the liquid filter is provided by a sealing ring 35, which is accommodated in an annular gap 36 of the screw-on cover. In the mounted state of the screw-on cover, a sealing edge 37 of housing base 10 reaches into annular gap 36, which brings about the sealing effect by deforming sealing ring 35.

To replace filter cartridge 17, the screw-on cover is first unscrewed far enough that sealing edge 37 no longer contacts sealing ring 35. This causes draining channel 38 and venting channel 39 to be unblocked. To prevent oil from running out through thread 12, an additional seal 31 is provided, which acts in area (a).

What is claimed is:

1. A liquid filter with a substantially cylindrical housing comprising:

a housing base equipped with an inlet and an outlet, a detachable screw-on cover which seals the housing base, a replaceable filter cartridge which is fixed in place by the screw-on cover and the housing base, a sealable oil drain which in provided in the screw-on cover, and a sealable vent separate from said drain provided between said base and said cover sealing means which fit between the housing base and the screw-on cover to form a seal, said sealing means engaging with a sealing surface along which the sealing means slides in an axial area of axial displacement of the screw-on cover in the housing base through a rotation of at least 360° starting from a limit stop for the screw-on cover, wherein the liquid filter is intended for mounting positions with a substantially horizontal center axis, or inclined in downward direction, and wherein said drain and said vent are configured to be open through said rotation of at least 360° starting from the stop limit, wherein the sealable oil drain is arranged on an outer circumference of the screw-on cover such that the sealable oil drain can be brought to a lowest point of the housing by rotating the screw-on cover to permit complete drainage of any residual oil in the filter housing prior to replacement of the alter cartridge.

2. A liquid filter according to claim 1, wherein said oil drain comprises a drain plug.

3. A liquid filter according to claim 1, wherein the oil drain comprises channels in walls of the housing base or of the screw-on cover, wherein said channels are sealed from a sealed housing interior by the sealing means when the screw-on cover abuts the axial limit stop and are placed in fluid communication with the housing interior by rotating the screw-on cover starting from the limit stop for the screw-on cover.

4. A liquid filter according to claim 3, wherein the channels are partly formed by a thread between the housing base and the screw-on cover.

5. A liquid filter according to claim 4, wherein the thread in the screw-on cover comprises at least one recess which enlarges the channel.

6. A liquid filter according to claim 1, wherein the vent comprises channels in walls of the lousing base or of the screw-on cover, wherein said channels are sealed from a sealed housing interior by the sealing means when the screw-on cover abuts the axial limit stop and are placed in fluid communication with the housing interior by rotating the screw-on cover starting from the limit stop for the screw-on cover.

7. A liquid filter according to claim 6, wherein the channels are partly formed by a thread between the housing base and the screw-on cover.

8. A liquid filter according to claim 5, wherein the thread in the screw-on cover is provided with at least one recess which enlarges the channel.

9. A liquid filter according to claim 1, wherein the screw-on cover is formed with a saw-tooth thread.

10. A filter according to claim 1, wherein said filter is an oil filter of an internal combustion engine.

11. A filter according to claim 1, wherein said filter is a fuel filter of an internal combustion engine.

* * * * *